United States Patent

Taniguchi et al.

[11] Patent Number: 5,811,747
[45] Date of Patent: Sep. 22, 1998

[54] ELECTRONIC CONTROL UNIT-POSITION DETECTION SWITCH ASSEMBLY

[75] Inventors: Takao Taniguchi, Okazaki; Nobuaki Miki, Kariya; Takenori Kano, Toyota; Toshiya Morishita, Hekinan; Naoto Ogasawara, Chiryu; Naotaka Murakami; Ken Kiyama, both of Nishio, all of Japan

[73] Assignee: Aisin AW Co., Ltd., Anjo, Japan

[21] Appl. No.: 712,411

[22] Filed: Sep. 11, 1996

[30] Foreign Application Priority Data

| Sep. 18, 1995 | [JP] | Japan | 7-261967 |
| Sep. 18, 1995 | [JP] | Japan | 7-261968 |
| Sep. 18, 1995 | [JP] | Japan | 7-261969 |
| Sep. 18, 1995 | [JP] | Japan | 7-261970 |

[51] Int. Cl.$^6$ .......................... H01H 3/16; H01H 19/56; F16H 59/10; F16H 63/42

[52] U.S. Cl. .......................................................... 200/61.88

[58] Field of Search .............................. 200/61.88–61.91; 74/335; 477/111; 361/688–708

[56] References Cited

U.S. PATENT DOCUMENTS

| 3,939,313 | 2/1976 | Hayashi et al. ............... 200/61.89 X |
| 4,604,506 | 8/1986 | Gebhardt ...................... 200/61.89 X |
| 5,023,414 | 6/1991 | Mihara et al. ................. 200/61.91 |
| 5,101,677 | 4/1992 | Hammerschmitt ............. 74/335 |
| 5,679,937 | 10/1997 | Iwata .......................... 200/61.88 |
| 5,693,925 | 12/1997 | Yamada et al. ................ 200/61.88 |

FOREIGN PATENT DOCUMENTS

| 763677 | 3/1977 | European Pat. Off. . |
| 2340135 | 8/1974 | Germany . |
| A-2-3741 | 1/1990 | Japan . |

*Primary Examiner*—J. R. Scott
*Attorney, Agent, or Firm*—Oliff & Berridge, PLC

[57] ABSTRACT

An electronic control unit (ECU) and a position detection unit are disposed in separate chambers formed in a case. Two switch portions are separately disposed on opposite sides of a movable member of the position detection unit, thus reducing the size of the unit. The signal-related circuit that needs to be connected to the ECU for signal transmission and the drive circuit, for starting the starter motor and turning on the reverse lamps, that does not need the connection to the ECU for signal transmission, are separately disposed on the opposite sides of the movable member, that is, on the case side and a first cover side. The drive circuit is completely separated from the signal-related circuit and the ECU, thus preventing the drive circuit from electrically interfering with the signal-related circuit or the ECU.

17 Claims, 6 Drawing Sheets

ELECTRONIC CONTROL UNIT-POSITION DETECTION SWITCH ASSEMBLY

BACKGROUND OF THE INVENTION

1. Field of the Invention

The invention relates to an automatic transmission and, more particularly, to an electronic control unit-position detection unit assembly wherein an electronic control unit for controlling the automatic transmission is integrated with a position detection unit for detecting a shift range position selected by a driver's select operation and for outputting a detection positional signal to the electronic control unit.

2. Description of Related Art

A conventional automatic transmission uses an electronic control unit to control a fluid pressure control apparatus incorporated in the main body of the automatic transmission in order to automatically perform shifting within a range selected by the driving operation. The main body of the automatic transmission and the electronic control unit are disposed in separate locations in a vehicle. Because the two units must operate together to achieve a predetermined level of performance, strict quality control is required both when the two units are separate components and when they are connected to each other by assembly processes. However, because an automatic transmission main body and an electronic control unit are connected to one another when they are installed in a vehicle, it is normally difficult or impossible to perform quality control based on the one-to-one correspondence between automatic transmission main bodies and electronic control units before their installation into vehicles. Consequently, the two units must be adjusted so they match after being installed in the vehicle. Thus, quality control for automatic transmissions is difficult and requires many manhours.

To overcome this drawback, Japanese Patent Publication No. 2-3741, for example, discloses an electronic control unit integrated with an automatic transmission main body to allow for quality control based on a one-to-one correspondence before their installation. According to this reference, the two units are integrated by positioning an electronic control unit inside the case of a neutral start switch that is conventionally fixed to the automatic transmission casing for detecting a range position selected by the driver's select operation and for outputting an electric signal indicating the selected range position to the electronic control unit.

As the vehicle engine compartment, where the automatic transmission is located, contains many other units or components in addition to the engine, a large-size component attached to an external surface of the automatic transmission will interfere with the other units. It is therefore required that any component attached externally to the casing of an automatic transmission be of a compact size to avoid interference with the other units. However, this requirement, regarding the engine room space, is not specifically considered in the aforementioned reference, which merely discloses an electronic control unit disposed inside the position detection unit casing.

SUMMARY OF THE INVENTION

Accordingly, it is an object of the invention to provide a compact-structure assembly wherein an electronic control unit is integrated with the position detection unit.

Electronic control units carry on their substrates various devices that produce different quantities of heat due to electric current passing therethrough. If heat is not efficiently released from these heat producing devices, certain devices and their surroundings will become hot and cause performance reduction, adversely affecting the functions of the electronic control unit.

If the aforementioned neutral switch, which is mounted on an external surface of the automatic transmission casing, has a large fin or other heat radiating element formed on the case thereof to cool the electronic control unit, the total size of the unit will increase, giving rise to the aforementioned problem. Accordingly, a second object of the invention is to efficiently cool various devices on the substrate of the electronic control unit while reducing the overall size of an electronic control unit-position detection unit assembly.

According to the invention, there is provided an electronic control unit-position detection unit assembly comprising a position detection unit for detecting a position of a shift lever in accordance with the driver's operation; and an electronic control unit for controlling an automatic transmission in accordance with a signal indicating the traveling conditions of a vehicle, the position detection unit and the electronic control unit being integrated so as to be mountable on a casing of the automatic transmission. The position detection unit comprises a case; a first cover fixed to the case; a movable member disposed in a first space surrounded by the case and the first cover, the movable member being pivotable in accordance with driver's operation of a shift lever; a first switch portion provided between the movable member and the first cover, for electrically connecting a predetermined circuit provided on the first cover when the shift lever is in a predetermined position; and a second switch portion provided between the movable member and the case, for outputting a signal corresponding to a position of the shift lever. The electronic control unit comprises the case; a second cover fixed to the case; and an electronic control unit substrate provided in a second space surrounded by the case and the second cover. The substrate is fixed to the case and carries a plurality of devices, or electronic components, arranged thereon. The predetermined circuit connected by the first switch portion is connected to a connector terminal formed integrally with the first cover, by a connecting line integrated with the first cover. The second switch portion is connected to the electronic control unit substrate by a connecting line integrated with the case.

Because the switch portions of the position detection unit of the electronic control unit-position detection unit assembly of the invention are formed using opposite sides of the movable member, the position detection unit can be made compact compared with a structure of the switch portions using only one side of the movable member, to thereby reduce the overall size of the assembly.

Further, as the switch portions are provided on opposite sides of the movable member, it is possible to separately provide the first switch portion for electrically connecting the appropriate circuit, such as the ignition circuit, when the shift lever is in an associated position, such as the "P" or "N" range, and the second switch portion for outputting a signal corresponding to a position of the shift lever. This makes it possible to locate the aforementioned circuit independent from the electronic control unit in terms of signal transmission, by integrating the circuit with the first cover, that is, a separate member from the case, and also makes it possible to connect the second switch portion to the case by using the connecting line integrated with the case. Thus, the connection between the first switch portion and the aforementioned circuit, and the connection between the second switch portion and the electronic control unit can be achieved without having to connecting contacts or lines astride the case and the first cover. The structure reduces the manhours needed for making connections, reduces the incidence of connection or contact failure and facilitates the assembly and disassembly of the units.

According to the invention, it is preferred that the current flowing through the circuit connected by the first switch portion be larger than the current flowing through the electronic control unit substrate. The invention will prevent an incident where a large current through the circuit connected by the first switch portion affects the current through the second switch portion and the electronic control unit connected to thereto.

It is also preferred that the electronic control unit substrate have an overlap portion that overlaps with the locus of turning of the movable member, with respect to a direction generally perpendicular to the locus, and that a relatively low-height device of the plurality of devices be provided in the overlap portion and a relatively high-height device of the plurality of devices be provided in a portion of the substrate other than the overlap portion. This structure allows the overlap portion, having the low-height devices, to be positioned close to the movable member, that is, it allows for a reduction in the clearance between the surface of the electronic control unit substrate and the locus of the turning of the movable member. The structure thereby enables a reduction in the total thickness of the assembly and provides a more compact externally-mounted component on an automatic transmission main body that considerably reduces the interference with other units in the engine compartment.

The plurality of devices, or electronic components, are preferably arranged on opposite sides of the electronic control unit substrate to allow for a size reduction of the substrate. A more compact assembly can thus be provided.

In a further preferred structure, the position detection unit has a movable contact provided on the movable member and a stationary contact provided on a fixed member corresponding to the locus of the movable contact, the stationary contact is formed of a metallic material and has a heat releasing surface. The electronic control unit substrate is formed of a highly heat conductive material. The connecting line serves as a heat conducting line to conduct heat from a terminal of the substrate. With this structure, heat from the devices on the electronic control unit substrate propagates over the entire substrate and reaches the stationary contact through the connecting line. The stationary contact of the shift position detection unit then serves as a heat sink to release heat therefrom, thus improving the heat releasing efficiency compared with the conventional art. The efficient heat release from the devices and their surroundings ensures that the electronic control unit will perform as expected.

In a yet further preferred structure, at least one of the walls surrounding the second space is made of a highly heat conductive material, and a third space is defined between the one of the walls and the electronic control unit substrate and filled with a highly heat conductive resin. The highly heat conductive resin provided in the third space will conduct heat, generated from the operation of the electronic control circuit, to the wall at a higher rate than the rate in air. This structure thus enhances the efficiency of heat release from the electronic control unit compared with the conventional art, improving the reliability of the operation thereof.

It is also preferred that the electronic control unit be formed of a highly heat conductive material. With this structure, heat propagates over the entire substrate so as to increase the area of heat conduction to the resin and then to the wall. The structure thus provides a further increase in heat conductivity, enhancing the efficiency of heat release from the electronic control unit.

It is further preferred that the one of the walls that partially defines the third space be a wall other than a wall that faces the casing of the automatic transmission. Thereby, the heat release surface of the case can be placed in a low temperature location, that is, a location far from the automatic transmission, which also gets hot in operation.

It is also preferred that the plurality of devices be arranged on opposite sides of the electronic control unit substrate, and that a device that produces a relatively large quantity of heat be provided on a surface of the electronic control unit substrate partially defining the third space. Thereby, the heat conduction from the heat producing device to the case can be further improved.

In a further preferred structure, the one of the walls that partially defines the third space is at least a portion of the second cover, and a surface of the second cover partially defining the third space has a protrusion for placing the surface so as to face the surface of the substrate partially defining the third space while maintaining a smallest possible clearance therebetween. Thereby, the surface of the second cover can be positioned as close to the substrate as possible in accordance with the height of the devices provided on the surface of the substrate that partially defines the third space. The thus-achieved reduction in clearance between the substrate and the second cover means a reduction in the heat conduction distance through the resin, which is not so highly heat conductive as is an electrically conductive material but is used in this location since use of an electrically conductive material cannot be used in this location. Thus, this structure further improves the efficiency of heat conduction from the substrate and the heat producing devices to the case.

BRIEF DESCRIPTION OF THE DRAWINGS

The foregoing and further objects, features and advantages of the invention will become apparent from the following description of a preferred embodiment with reference to the accompanying drawings, wherein.

DETAILED DESCRIPTION OF THE PREFERRED EMBODIMENT

A preferred embodiment of the invention will be described hereinafter with reference to the accompanying drawings.

Figure 1:
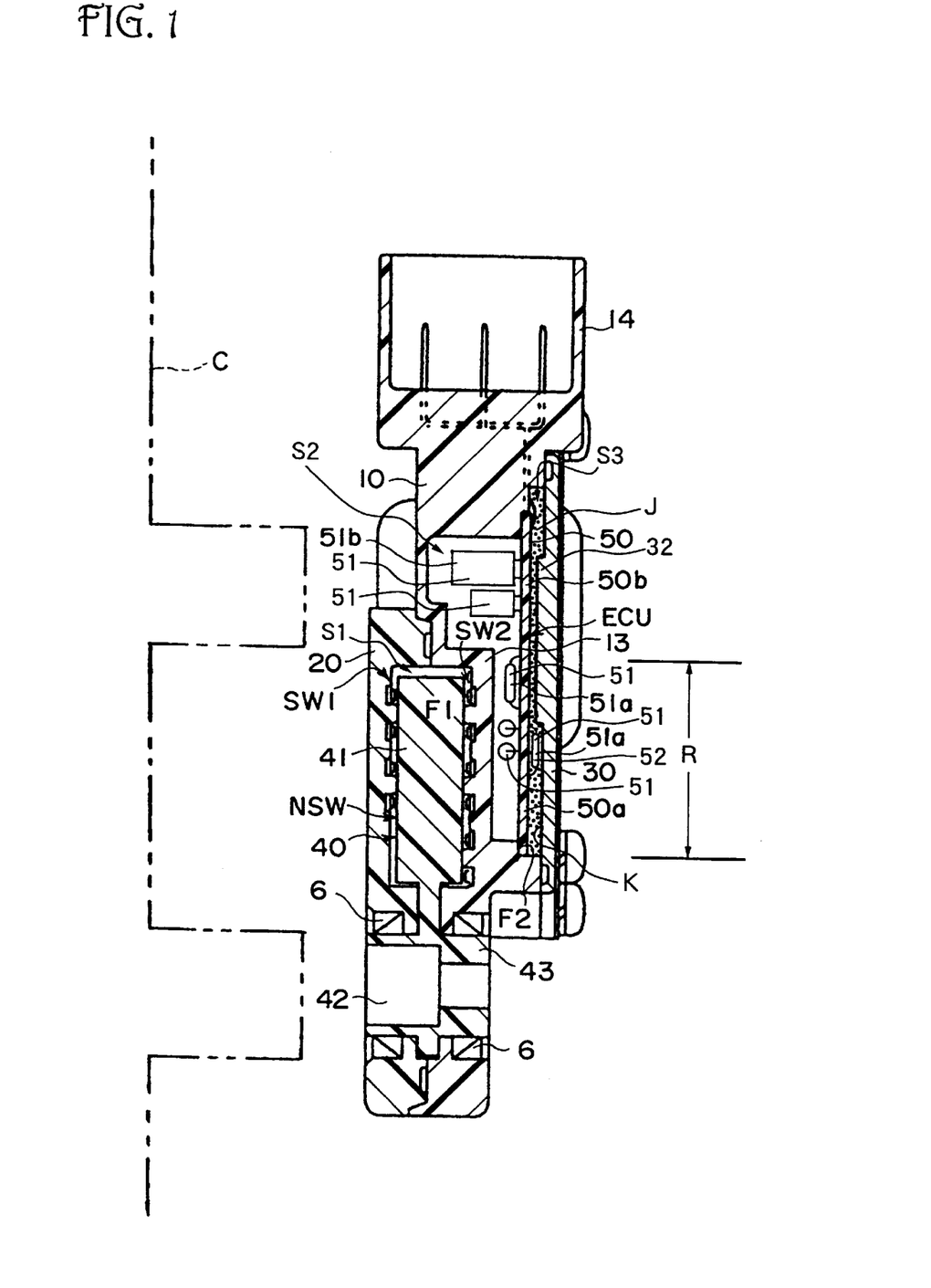
FIG. 1 is a sectional view of an embodiment of the electronic control unit-position detection unit assembly of the invention.

Referring to FIG. 1, in an embodiment of the electronic control unit-position detection unit assembly of the invention, an electronic control unit (ECU) is mounted on an automatic transmission casing C along with a neutral start switch (NSW), that is, a position detection unit, the NSW is between the ECU and the casing C. The electronic control unit-position detection unit assembly comprises a case 10, a first cover 20, a second cover 30, a movable member (rotor) 40, and an ECU substrate 50. These components and the interrelationships therebetween will be described.

The case 10 is formed of a highly electrically insulating resin. As shown in the front and rear views of FIGS. 2 and 3, the case 10 comprises a sector-shaped switch chamber section 11 partially defining a first space S1 on the back side, a rectangular ECU chamber section 12 partially defining a second space S2 on the front side, and a partition wall 13 (see FIG. 1) between the two chamber sections. The switch chamber section 11 is disposed so that a central portion of the sector-shaped chamber is off set from the ECU chamber section 12. The center portion of the switch chamber section 11 has a stepped hole 19 into which a sleeve shaft 43 of the movable member 40 (see FIG. 1) and an oil seal 6 (FIG. 1) for sealing the periphery of the shaft 43 are fitted. Connectors 14, 15 for receiving and transmitting signals are formed together with two side portions of the rectangular ECU chamber section 12 and protrude therefrom. A pair of protruding mount flanges 16 are provided in generally diagonally opposite portions of the ECU chamber section 12. The flanges 16 have bolt insert holes for fastening the case 10 to the automatic transmission casing C (see FIG. 1).

The first cover 20, covering the switch chamber section 11, is formed of generally the same material as that of the case 10. The first cover 20 has a sector shape complimentary to the shape of the switch chamber section 11, as shown in the interior view of FIG. 4, so that it fits to and covers switch chamber section 11. The first cover 20 is fixed in position relative to the case 10 in a socket-and-spigot joint fashion. As in the case 10, a center portion of the sector-shaped first cover 20 has a stepped hole 21 into which the sleeve shaft 43 of the movable member 40 is fitted and an oil seal 6 for sealing the periphery of the shaft 43. A connector 22 is formed together with the first cover 20 and protrudes therefrom. The first cover 20 has a seal ring groove 23 for fittingly receiving an O-ring. The groove 23 extends along the entire joint edge for coupling with the switch chamber section 11 of the case 10.

Figure 5:
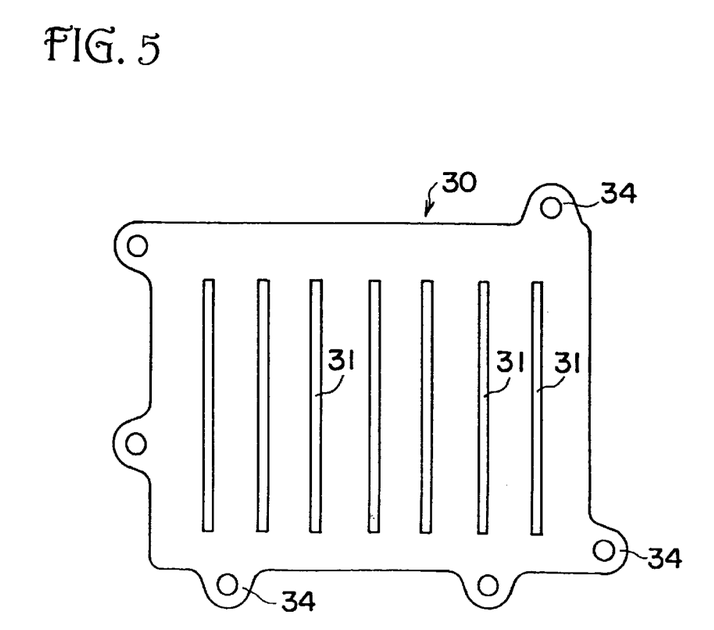
FIG. 5 shows an exterior of a second cover according to the embodiment.
Figure 6:
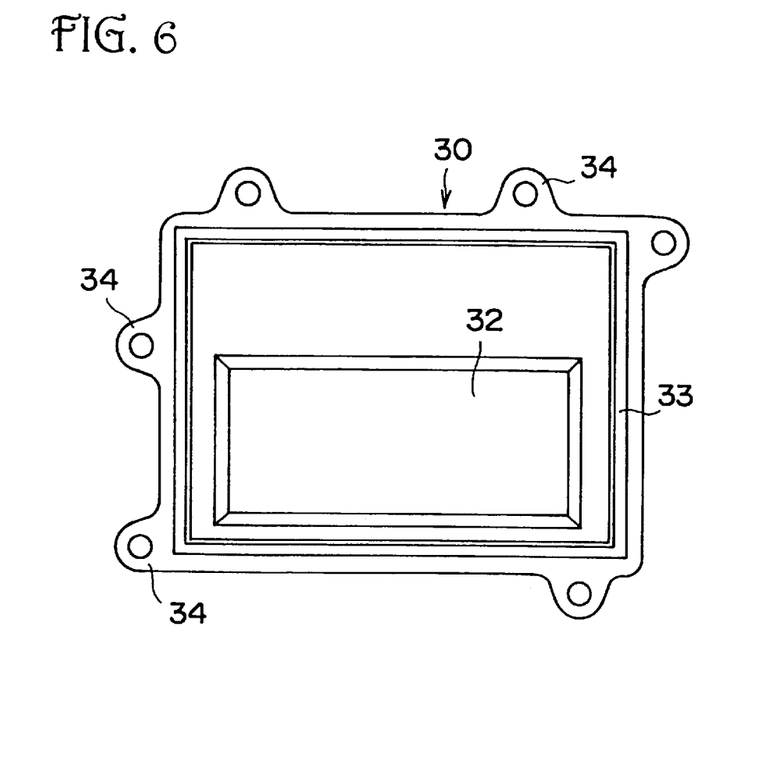
FIG. 6 shows an interior of the second cover according to the embodiment.
Figure 7:
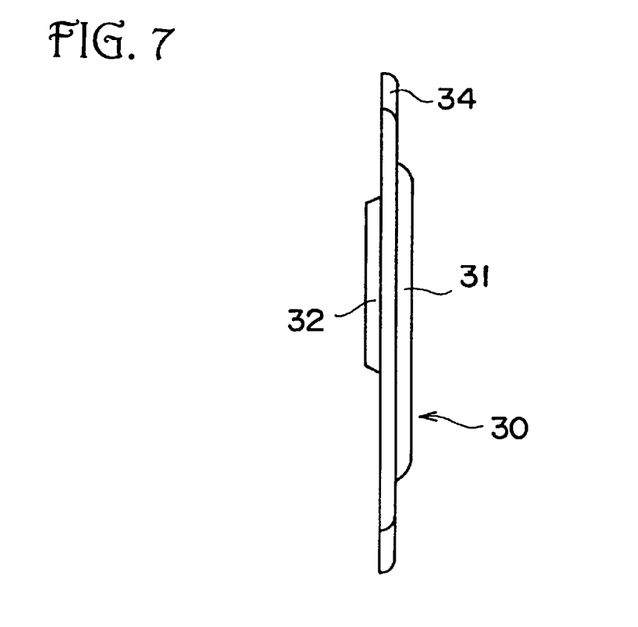
FIG. 7 is a side view of the second cover.

The second cover 30, forming a wall K remote from the automatic transmission casing C, has a rectangular plate-like shape formed of a material having good heat conductivity, such as aluminum. The second cover 30 has many ridge-like heat release fins 31 formed on the outside surface thereof, as shown in FIGS. 5 and 7. Provided on the inside surface thereof is a heat conduction protuberance 32, FIGS. 6 and 7, to bring the highly conductive heat cover wall K facing the substrate 50, as close as possible to the substrate 50, as shown in FIG. 1. The fins 31 and the protuberance 32 are formed together with the second cover 30. The second cover 30 has a seal ring groove 33 for fittingly receiving an O-ring. The groove 33 extends along the entire joint edge for coupling with the ECU chamber section 12 of the case 10. A plurality of mount flanges 34 protrude from the peripheral edge of the second cover 30 and are spaced from one another. Using the mount flanges 34, the second cover 30 can be screwed to the front surface of the case 10.

Figure 3:
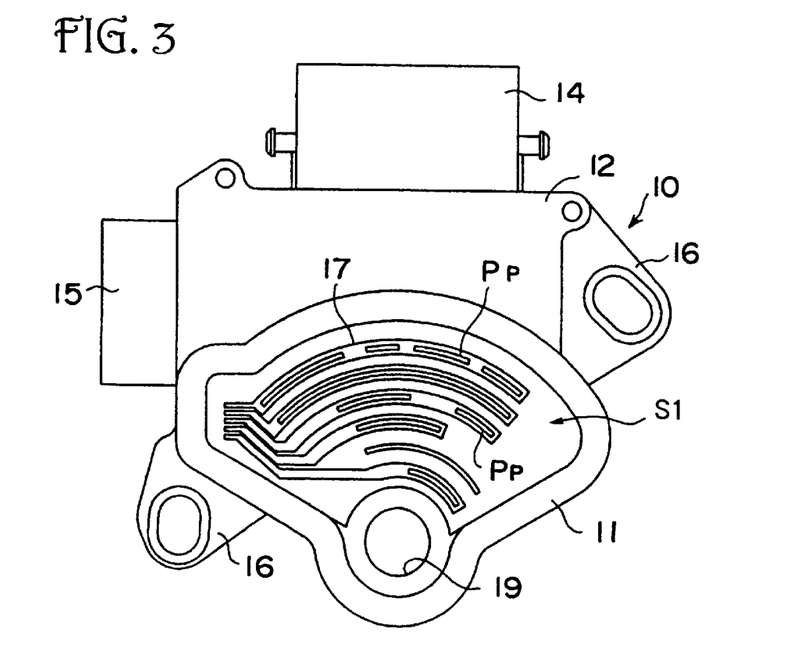
FIG. 3 is a rear view of the case shown in FIG. 2.
Figure 4:
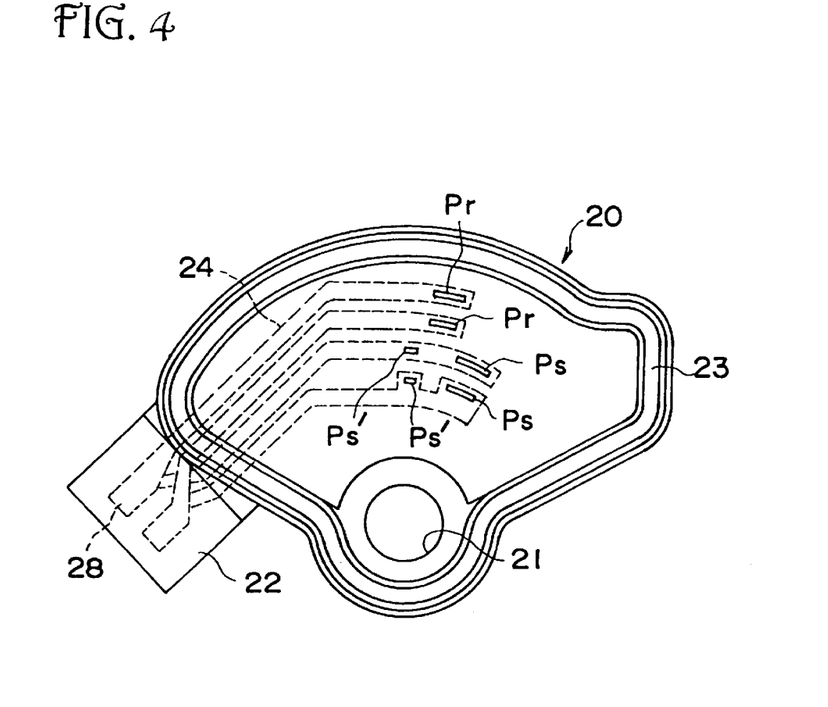
FIG. 4 shows an interior of a first cover according to the embodiment.
Figure 9:
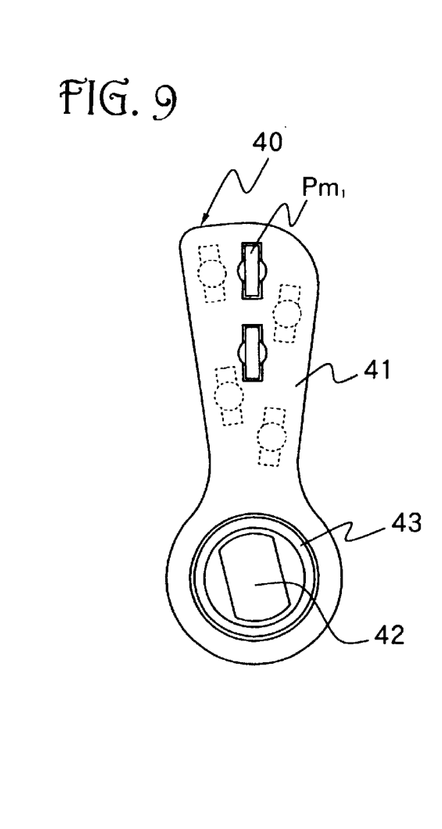
FIG. 9 is a diagram of a movable member according to the embodiment, showing a side thereof on which the first switch portion is provided.
Figure 10:
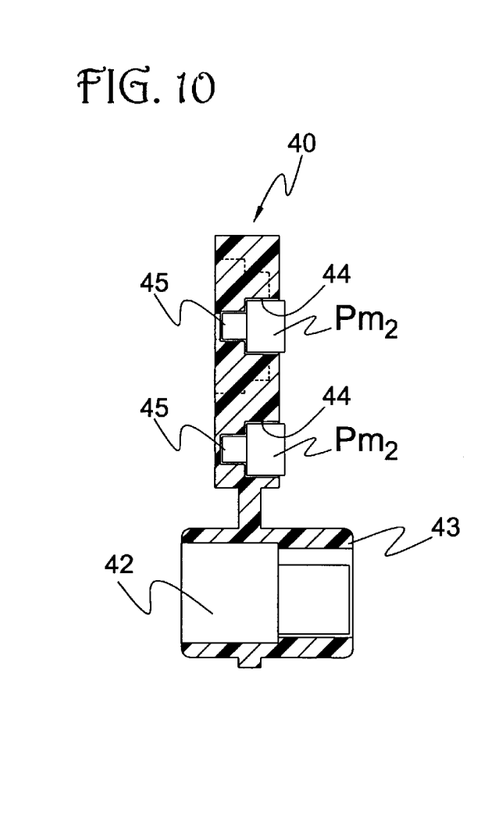
FIG. 10 is a sectional view of the movable member shown in FIG. 9.
Figure 11:
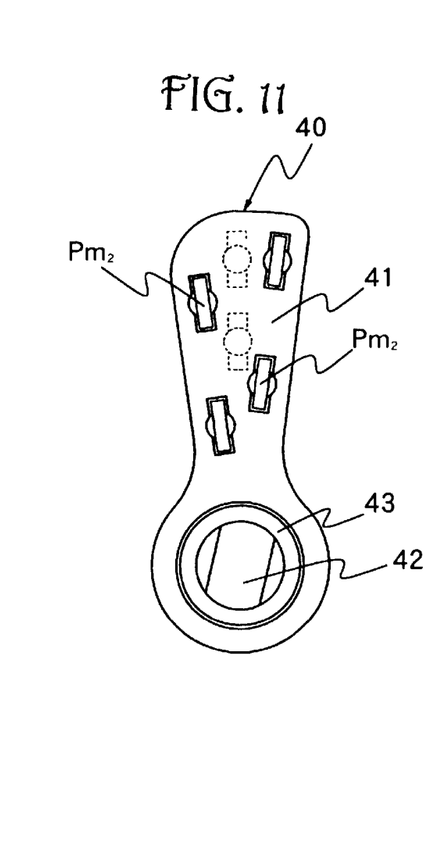
FIG. 11 is a diagram of the movable member, showing a side thereof on which the second switch portion is provided.

The movable member 40 is formed of generally the same material as that of the case 10. The movable member 40 comprises a plate-like arm 41 and a sleeve shaft 43 provided on an end of the arm 41 as shown in FIGS. 1, 9, 10, 11. FIG. 9 shows a side of the movable member 40 on which a first switch portion SW1 ($Pm_1$) is formed. FIG. 11 shows the opposite side of the movable member 40 on which a second switch portion SW2 ($Pm_2$) is formed. FIG. 10 is a sectional view of the movable member 40. The sleeve shaft 43 has a hole 42 into which a manual shaft is inserted. Approximately half of the hole 42 with respect to the entire length of the hole (that is, the length of the shaft) is a cylindrical hole as shown in FIG. 10. The other half of the hole 42 is a width-reduced hole defined by a pair of generally parallel flat inner surfaces and a pair of cylindrically curved inner surfaces. The arm 41 of the movable member 40 has holes 44 formed in positions corresponding to stationary contacts Pp, Ps, Ps', Pr (FIGS. 3 and 4).

Disposed inside each hole 44 are a spring 45 and a movable contact $Pm_1$ or $Pm_2$. The sleeve shaft 43 of the movable member 40 is freely rotatably fitted into the stepped hole 19 of the case 10 and the stepped hole 21 of the first cover 20, and the arm 41 is disposed in the first space S1 defined between, that is, enclosed by, the case 10 and the first cover 20. The gaps formed between the peripheral surface of the sleeve shaft 43 and the two stepped holes are sealed by the oil seals 6. The space is filled with electrically insulating grease that serves as a lubricant for preventing abrasion of the first and second switch portions SW1, SW2, more specifically, abrasion of the stationary contacts Pp, Ps, Ps', Pr and the movable contacts $Pm_1$, $Pm_2$ provided on the movable member (rotor) 40. The grease covering the first and second switch portions SW1, SW2 eliminates the possibility of a short circuit between the contacts even if the space is contaminated with water or dust.

The first switch portion SW1 is formed between the movable member 40 and the first cover 20 as shown in FIG. 1. The first switch portion SW1 comprises two pairs of starter motor circuit contacts Ps, Ps' and a pair of reverse lamp circuit contacts Pr exposed on the inner surface of the first cover 20 by projecting portions of long plate-like connecting lines 24 embedded in the first cover 20, as shown in FIG. 4, and the movable contacts $Pm_1$, for interconnecting these pairs of contacts Ps, Ps', Pr. According to this embodiment, the connecting lines 24 are directly led into the connector 22 to form terminals 28 therein. Thus, the connecting lines 24 form circuits starting from the terminals 28 and extending inside the first cover 20 and returning to the terminals 28, that is, terminals 28 are connected to circuits separate from the case 10, such as the ignition switch and the reverse lamps.

The second switch portion SW2 is formed between the movable member 40 and the case 10. The second switch portion SW2 comprises many narrow arcuate contacts Pp formed by projecting portions of relatively wide arcuate connecting lines 17 (also serving as heat release surfaces) that are formed of metal plates, such as copper plates, and fixed to the inner surface, that is, a surface of partition wall 13, of the switch chamber section 11 of the case 10, and the movable contacts $Pm_2$ fixed to the arm 41 of the movable member 40. The connecting lines 17, having the contacts Pp, are led through the partition wall 13 of the case 10 to a substrate connecting pad 12a provided in the second space S2, where the connecting lines 17 are connected to terminals 50c of the ECU substrate 50 (indicated by phantom lines in FIG. 2) by wire bonding or other methods. Thus, the connecting lines 17 extend inside the case 10 to electrically connect the position detection unit (NSW) and the electronic control unit (ECU) and thermally connect therebetween serving as heat connecting lines.

The ECU substrate 50 is formed of a highly heat conductive material, such as a ceramics, or a combination of a highly heat conductive material, such as ceramics, and a conventional glass fabric base epoxy resin laid thereon. The ECU substrate 50 carries devices 51, such as a microcomputer chip, transistors, resistors, capacitors and other circuit devices, arranged on a printed circuit that is formed on the surface of the substrate 50, as is well known. The ECU substrate 50 is positioned by abutting it on a stepped portion in the second space S2, and connected at pad portions to a group of terminal connecting lines 18 provided in each connector 14, 15 by wire bonding or other methods. The groups of terminal connecting lines 18 are led into the respective connectors 14, 15 via the inside of the case 10, so as to form connecting terminals. The connectors 14, 15 are connected to various sensors and solenoid valves of a fluid pressure control unit disposed in the automatic transmission main body and to an engine control unit and sensors disposed in various locations in the vehicle.

Figure 2:
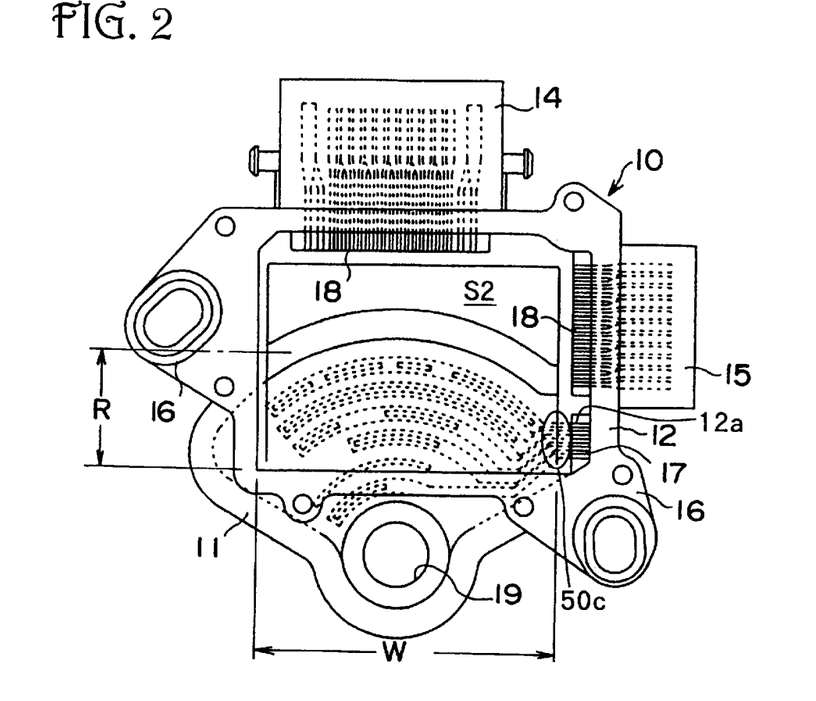
FIG. 2 is a front elevation of a case according to the embodiment shown in FIG. 1.

The surface of the ECU substrate 50 is positioned parallel to the locus of turning of the movable member (rotor) 40. The ECU substrate 50 has an overlap portion 50a that overlaps with the movable member 40 with respect to the direction of the rotational axis of the movable member 40, that is, the direction perpendicular to the turning locus of the movable member 40 and the surface of the ECU substrate 50. FIGS. 1 and 2 show the radial dimension R and widthwise dimension W of the overlap portion 50a. Relatively low-height devices 51a of the devices 51, such as resistors, are provided on both sides of the overlap portion 50a of the ECU substrate 50. Relatively high-height devices 51b, such as capacitors, are provided on a substrate portion 50b other than the overlap portion 50a. Thus, the embodiment reduces the size of the electronic control unit-position detection unit assembly, providing a compact product. The automatic transmission having this externally mounted component is freed from the positional or disposal limitations due to the interference with other units when installed in the engine compartment of a vehicle.

A third space S3 is defined between the second cover 30 and the ECU substrate 50 disposed in the second space S2. The third space S3 is filled with a highly heat conductive resin J. The resin J preferably has a heat conductivity of $1.0 \times 10^{-3}$ cal/(cm·sec·° C.) or greater, producing a very good result. The gap between the ECU substrate 50 and the second cover 30 is filled with the resin J, eliminating air therebetween. Devices 52, that produce large quantities of heat, are disposed on the surface of the ECU substrate 50 that is exposed to the third space S3, that is, the surface closer to the second cover 30, in order to facilitate heat conduction from the heat producing devices 52 to the case 10. In addition, the surface of the heat conduction protuberance 32, formed on the inside surface of the second cover 30, is placed as close to the surface of the ECU substrate 50 as possible (which means that the two surfaces are close to each other but sufficiently apart to avoid a short circuit therebetween), in order to compensate for the heat conduction through the layer of resin J, whose heat conductivity is higher than that of air but lower than that of a highly heat conductive metal.

Figure 8:
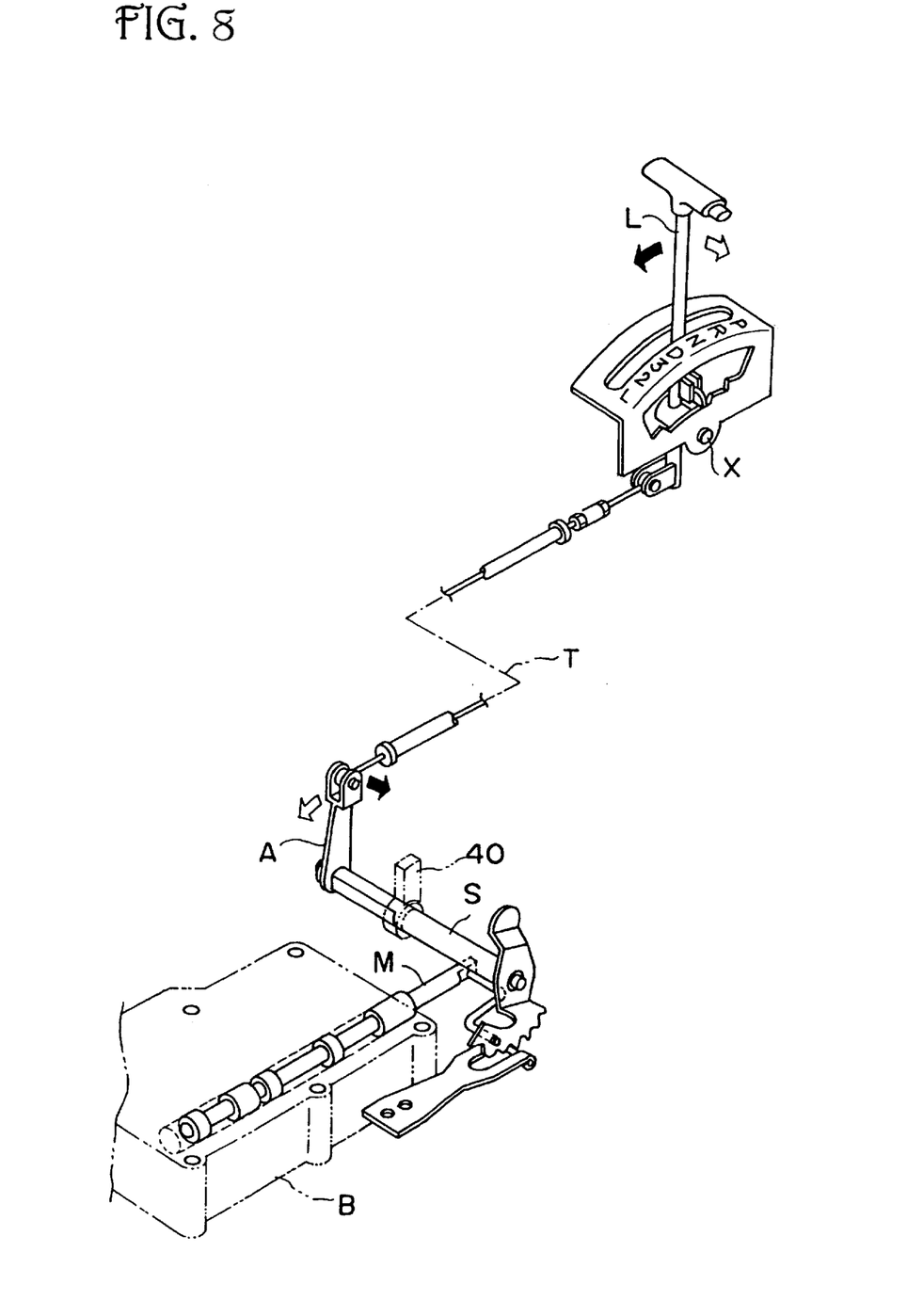
FIG. 8 schematically illustrates the connection between a shift apparatus and an automatic transmission main body on which the embodiment of the electronic control unit-position detection unit assembly is mounted.

The electronic control unit-position detection unit assembly is fixed to the automatic transmission casing C as shown in FIG. 1. As shown in the schematic illustration of FIG. 8, rotation of a shift lever L of the shift apparatus around a shaft X is transmitted to an outer lever A of the automatic transmission main body by a control wire T, thus rotating the manual shaft S. The rotation of the manual shaft S rotates the movable member 40 (indicated by phantom lines in FIG. 8). The shift lever L is in the neutral range "N" position in FIG. 8. If the shift lever L is moved forward, that is, to the reverse range "R" position or the parking range "P" position, the outer lever A is pushed by the wire T to turn in a direction indicated by the outline arrow. If the shift lever L is moved backward, that is, to the drive range "D" position, the third range "3" position, the second range "2" position, or the low range "L" position, the outer lever A is pulled by the control wire T to turn in the direction indicated by the solid arrow. This operation causes the switching operation of the switch portion of the position detection unit and the sliding switch operation of a manual valve M, provided in a valve body B, of the fluid pressure control apparatus.

During the shift operation, the starter contacts Ps, Ps' of the position detection unit, shown in FIG. 4, are interconnected when the shift lever L is in the neutral range "N" and parking range "P" positions. The reverse contacts Pr are interconnected when the shift lever L is in the reverse range "R" position. The interconnections as described close an appropriate circuit through switch SW1. Thus, when Ps, $P_s'$ are interconnected the ignition may be turned on. Where contacts Pr are interconnected, the reverse lamps are turned on. Further, the second switch portion SW2 outputs a neutral range "N" position signal, a parking range "P" position signal, or a reverse range "R" position signal to the ECU substrate 50, in response to the interconnection of the corresponding contacts. When the shift lever L is moved to the drive range "D" position or the other range "3", "2", "L" positions, only the second switch portion SW2 operates to output the corresponding position signal to the ECU substrate 50 in response to the interconnection of the corresponding stationary contacts Pp.

As understood from the above description, this embodiment disposes the electronic control unit (ECU) and the position detection unit (NSW) in separate chambers inside the case 10 to protect the electronic control unit (ECU) from the influence of the position detection unit (NSW), which is subject to water or dust contamination because it comprises the movable member 40 mechanically connected to apparatuses outside the case 10. In addition, the switch portions SW1, SW2 are separately disposed on the opposite sides of the movable member 40, to reduce the radial dimension of the position detection unit. Using the exterior features of the position detection unit (NSW) and the electronic control unit (ECU), the units are overlapped with each other with respect to the axial and radial directions, to reduce the size of the assembly of the two units.

Further, the signal generating circuit that must be connected to the electronic control unit for signal transmission and the drive circuit (for starting the starter motor and turning on the reverse lamps), that need not be connected to the electronic control unit for signal transmission, are separately disposed on the opposite sides of the movable member 40, that is, the case side and the first cover side. Thus, the drive circuit, including the connector 15, is completely separated from the electronic control unit (ECU) and the signal generating circuit of the position detection unit (NSW). The drive circuit requires a large current, for example, 50 A, while the signal generating circuit requires only a small current, for example, 0.05 A. Because the two circuits greatly differ in required current, the separation of the two circuits is necessary in order to protect the electronic control unit (ECU) from the effect of a large current flowing through the drive circuit, that is the circuits associated with switch SW1.

In addition, since the electronic control unit (ECU) and the position detection unit (NSW) are disposed in separate chambers in the case 10 in such a manner that removal of the cover for the electronic control unit (ECU), that is, the second cover 30, does not affect the position detection unit (NSW). Thus, it is easy to replace the ECU substrates 50 in accordance with specifications. The embodiment thus advantageously allows for generalization of the assembly using a common type of position detection unit (NSW). Furthermore, the ECU substrate 50 is disposed in the second space S2 that is accessible from the front side simply by removing the second cover 30 while the case 10 remains fixed to the automatic transmission casing C, as understood from the illustration of FIG. 1. This manner of mounting the case 10 to the casing C enhances the advantages of the embodiment.

From the standpoint of integration the conventional device arrangement on the electronic control unit substrate, where devices of various heights are mingled due to circuit requirements, the embodiment concentrates the low-height devices 51a in the overlap portion 50a and avoids disposal of high-height devices 51b in the overlap portion 50a as much as possible. The embodiment thus allows for a further reduction in the thickness of and the area required by the assembly.

Further, the embodiment contains a number of components for improving heat release efficiency. The electronic control unit (ECU) has the case 10, the second cover 30, and the highly heat conductive substrate 50 disposed the second space S2 defined by the case 10 and the second cover 30. A wall of the second space S2 defined by the case 10 and the second cover 30, that is, the wall K of the second cover 30, remote from the automatic transmission casing according to the embodiment, is formed of a highly heat conductive metal material. The third space S3, between the wall K and the substrate 50, is filled with the highly heat conductive resin J. In addition, the heat conduction protuberance 32 of the wall K is placed very close to the substrate 50, and the devices 52 that produce large quantities of heat are disposed on the side of the substrate 50 facing the wall K. Thereby, heat produced by operation of the electronic control circuit, particularly, the high heat producing devices 52, is diffused over the entire substrate 50 and conducted from the large heat conducting area of the substrate 50 to the wall K through the very thin layer of resin J. In other words, heat from the heat producing devices 52 is efficiently conducted to the wall K, which serves as a heat releasing member. The embodiment thus achieves efficient cooling of the electronic control unit (ECU) due to an improvement in the heat release efficiency.

The structure of the second switch portion SW2, that is, the position switch, may be modified in various ways in accordance with the type of switch employed. For example, if optical sensors are used, the second switch portion may be such that light emitting portions and light receiving portions are disposed on the case and reflecting surfaces are provided on the movable member. If magnetic sensors are disposed on the case, magnetic members or gaps are provided on the facing surface of the movable member.

While the invention has been described with reference to what is presently considered to be a preferred embodiment thereof, it is to be understood that the invention is not limited to the disclosed embodiments. To the contrary, the invention is intended to cover various modifications and equivalent arrangements included within the spirit and scope of the appended claims.

What is claimed is:

1. An electronic control unit-position detection unit assembly, comprising:

a position detection unit for detecting a position of a shift lever in accordance with a driver's operation thereof; and an electronic control unit for controlling an automatic transmission in accordance with a signal indicating traveling conditions of a vehicle, the position detection unit and the electronic control unit being integrated so as to be mountable on a casing of the automatic transmission, the position detection unit comprising:
a case;
first cover fixed to the case;
a movable member disposed in a first space surrounded by the case and the first cover, the movable member being movable in accordance with the driver's operation of the shift lever;
a first switch portion provided between the movable member and the first cover for electrically connecting a predetermined circuit provided on the first cover when the shift lever is in a predetermined position, and a second switch portion provided between the movable member and the case for outputting a signal corresponding to a position of the shift lever, the electronic control unit comprising:
the case;
a second cover fixed to the case; and an electronic control unit substrate provided in a second space surrounded by the case and the second cover, the substrate being fixed to the case and having a plurality of devices arranged thereon,
the predetermined circuit connected by the first switch portion being connected to a connector terminal formed integrally with the first cover, by a connecting line integrated with the first cover, and
the second switch portion being connected to the electronic control unit substrate by a connecting line integrated with the case.

2. The electronic control unit-position detection unit assembly according to claim 1, wherein current flowing through the circuit connected by the first switch portion is larger than current flowing through the electronic control unit substrate.

3. The electronic control unit-position detection unit assembly according to claim 1,
wherein the electronic control unit substrate has an overlap portion that overlaps with the locus of movement of the movable member with respect to a direction generally perpendicular to the locus, and a relatively low-height device of said plurality of devices is provided in the overlap portion and a relatively high-height device of said plurality of devices is provided in a portion of the substrate other than the overlap portion.

4. The electronic control unit-position detection unit assembly according to claim 3, wherein said plurality of devices are arranged on both sides of the electronic control unit substrate.

5. The electronic control unit-position detection unit assembly according to claim 1, wherein the position detection unit has a movable contact provided on the movable member and a stationary contact provided on a fixed member corresponding to the locus of the movable contact, the stationary contact formed of a metallic material and having a heat releasing surface, the electronic control unit substrate formed of a highly heat conductive material, and the connecting line also serving as a heat conducting line to conduct heat from a terminal of the substrate.

6. The electronic control unit-position detection unit assembly according to claim 1, wherein at least one of the walls surrounding the second space is made of a highly heat conductive material, and a third space is defined between the one of the walls and the electronic control unit substrate and filled with a highly heat conductive resin.

7. The electronic control unit-position detection unit assembly according to claim 6, wherein the electronic control unit substrate is formed of a highly heat conductive material.

8. The electronic control unit-position detection unit assembly according to claim 6, wherein said one of the walls is a wall other than a wall that faces the casing of the automatic transmission.

9. The electronic control unit-position detection unit assembly according to claim 6, wherein said plurality of devices are arranged on both sides of the electronic control unit substrate, and a device that produces a relatively large quantity of heat is provided on a surface of the electronic control unit substrate partially defining the third space.

10. The electronic control unit-position detection unit assembly according to claim 8, wherein said one of the walls is at least a portion of the second cover, and a surface of the second cover partially defining the third space has a protrusion for placing the surface so as to face the surface of the substrate partially defining the third space, while maintaining a smallest-possible clearance therebetween.

11. A control assembly for use with an automatic transmission, comprising:

a case;

a first cover mounted to a first side of the case, a first space defined between the first cover and the case;

a second cover mounted to a second side of the case, a second space defined between the second cover and the case;

a first member rotatably mounted to the case and the first cover, the first member having an arm extending into the first space;

a second member fixedly mounted in the second space between the case and the second cover, the second member dividing the second space into a primary portion between the second member and the case and a secondary portion between the second member and the second cover;

a first switch structure provided by contacts on the arm and the first cover and a second switch structure provided by contacts on the case and the arm, the first and second switch structures outputting signals corresponding to an operator established shift position, wherein the second member is a circuit board and the first space and the second space have an overlapping region where they are separated by a wall of the case.

12. The control assembly according to claim 11, further comprising a plurality of electrical components mounted to the circuit board, electrical components having a small size mounted to the second member in the overlapping region and electrical components having a large size mounted to the circuit board on a non-overlapping region.

13. The control assembly according to claim 11, further comprising a high heat transmission, electrically non-conductive material filing the secondary portion.

14. The control assembly according to claim 11, wherein the second cover has at least one heat radiating element mounted on a side that is opposite the second space.

15. The control assembly according to claim 14, wherein the second cover has a protrudance on a side closest to the second member.

16. The control assembly according to claim 11, wherein a current flows through the circuit board, the first switch structure, and the second switch structure, the current flowing through the first switch structure greater than a second current flowing through the second switch structure and the circuit board.

17. The control assembly according to claim 11, wherein the contacts on the first cover and the contacts on the case are along and correspond to arcs transversed by the contacts mounted on the arm.

* * * * *